US011845557B2

(12) United States Patent
Suhre et al.

(10) Patent No.: US 11,845,557 B2
(45) Date of Patent: Dec. 19, 2023

(54) SPRINGLESS DRESS COVER AND LOWER CLOSEOUT SYSTEM FOR PASSENGER SEAT

(71) Applicant: B/E Aerospace, Inc., Winston-Salem, NC (US)

(72) Inventors: Ryan J. Suhre, Winston-Salem, NC (US); Stephen A. Puglisi, Greensboro, NC (US); Neil M. Ralph, Winston-Salem, NC (US); Lazaro E. Martinez, Clemmons, NC (US); Bradford M. D'Alessio, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/707,504

(22) Filed: Mar. 29, 2022

(65) Prior Publication Data
US 2023/0312100 A1 Oct. 5, 2023

(51) Int. Cl.
*B64D 11/06* (2006.01)

(52) U.S. Cl.
CPC ...... *B64D 11/0636* (2014.12); *B64D 11/0647* (2014.12)

(58) Field of Classification Search
CPC . B64D 11/0636; B64D 11/0647; B64D 11/06; A47C 31/02; A47C 31/023; A47C 5/06
(Continued)

(56) References Cited

U.S. PATENT DOCUMENTS

| 3,979,149 A | 9/1976 | Vogel |
| D277,526 S | 2/1985 | White |

(Continued)

FOREIGN PATENT DOCUMENTS

| CA | 2652584 A1 | 11/2007 |
| CN | 108688814 A | 10/2018 |

(Continued)

OTHER PUBLICATIONS

Bright, Craig, "These seven airlines are introducing new ecomony class seats", URL: https://www.businesstraveller.com/business-travel/2018/06/06/seven-airlines-introducing-new-economy-class-seats/, Business Traveller, Jun. 6, 2018.

(Continued)

*Primary Examiner* — Mark R Wendell
(74) *Attorney, Agent, or Firm* — Suiter Swantz pc llo

(57) ABSTRACT

A springless lower closeout system for a passenger seat includes left-side and right-side seat spreaders defining a lower aft portion of the passenger seat between them. Each seat spreader includes a restrictive channel extending along the left and right sides of the seat spreader, oriented toward the lower aft portion of the passenger seat. A dress cover extends in a taut state between the left-side and right-side seat spreaders. The dress cover includes cord elements on its left and right edges, the cord elements insertable into the left-side restrictive channels to directly connect the dress cover to the seat spreaders, closing out the lower aft portion of the passenger seat. A zipper or fastener connecting the dress cover and either edge may be partially unfastened to adjust the tension of the dress cover and facilitate attachment or removal of the cord elements to or from the restrictive channels.

12 Claims, 7 Drawing Sheets

(58) Field of Classification Search
USPC .................................................. 297/218.3
See application file for complete search history.

(56) References Cited

U.S. PATENT DOCUMENTS

| | | | |
|---|---|---|---|
| 5,553,923 | A | 9/1996 | Bilezikjian |
| 5,762,403 | A * | 6/1998 | Robinson ................. A47C 7/40 297/440.11 |
| 6,749,266 | B2 | 6/2004 | Williamson |
| 6,955,371 | B2 | 10/2005 | French |
| D686,422 | S | 7/2013 | Robinson |
| D750,392 | S | 3/2016 | Wilkens |
| 9,580,175 | B2 | 2/2017 | Velasco et al. |
| 9,764,844 | B2 | 9/2017 | Le et al. |
| D840,701 | S | 2/2019 | Scott et al. |
| D866,209 | S | 11/2019 | Princip et al. |
| 10,518,886 | B2 | 12/2019 | Velasco |
| D882,975 | S | 5/2020 | Abelheira et al. |
| 10,737,601 | B2 | 8/2020 | Gilbert |
| 11,014,675 | B2 * | 5/2021 | Velasco ............. B64D 11/0647 |
| D936,383 | S | 11/2021 | Scott et al. |
| 11,172,765 | B1 | 11/2021 | Zurian |
| 11,203,434 | B2 | 12/2021 | D'Alessio et al. |
| 2003/0094542 | A1 | 5/2003 | Williamson |
| 2009/0108132 | A1 | 4/2009 | Guttropf |
| 2011/0101165 | A1 * | 5/2011 | Fullerton ............... B64D 11/06 244/122 R |
| 2012/0098322 | A1 | 4/2012 | Müller |
| 2013/0062924 | A1 * | 3/2013 | Caldwell .............. A47C 31/023 297/452.63 |
| 2014/0183925 | A1 | 7/2014 | Clauser et al. |
| 2014/0300171 | A1 * | 10/2014 | Velasco .................... A47C 5/06 297/452.18 |
| 2014/0375090 | A1 | 12/2014 | Wegenka et al. |
| 2021/0122474 | A1 * | 4/2021 | D'Alessio .......... B64D 11/0647 |
| 2021/0315384 | A1 | 10/2021 | Oomen et al. |
| 2021/0387732 | A1 | 12/2021 | Salzer |
| 2022/0009639 | A1 | 1/2022 | Yvon et al. |

FOREIGN PATENT DOCUMENTS

| | | |
|---|---|---|
| DE | 4216967 C1 | 9/1993 |
| DE | 102006015515 A1 | 10/2007 |
| EP | 3816048 A1 | 5/2021 |
| JP | S61187783 U | 11/1986 |
| WO | 2014193322 A1 | 12/2014 |
| WO | 2017044157 A1 | 3/2017 |
| WO | 2022000044 A1 | 1/2022 |

OTHER PUBLICATIONS

Collins Aerospace, "Pinnacle® Economy Class Seating", URL:https://www.collinsaerospace.com/what-we-do/Commercial-Aviation/Cabin/Seating/Economy-Class, downloaded Feb. 11, 2022, 6 pages.
Keder Solutions, https://www.kedersolutions.com/products/.
Anonymous: "GN 920.1 Steel Wedge Clamps; JW Winco Standard Parts", Jan. 25, 2021, pp. 1-3.
Anonymous: "RZ7 seat post wedge clamp assembly-PARLEE Cycles", Aug. 12, 2020, pp. 1-3.
Extended European Search Report dated Aug. 1, 2023; European Application No. 23164303.2.
Extended European Search Report dated Aug. 1, 2023; European Application No. 23164385.9.

* cited by examiner

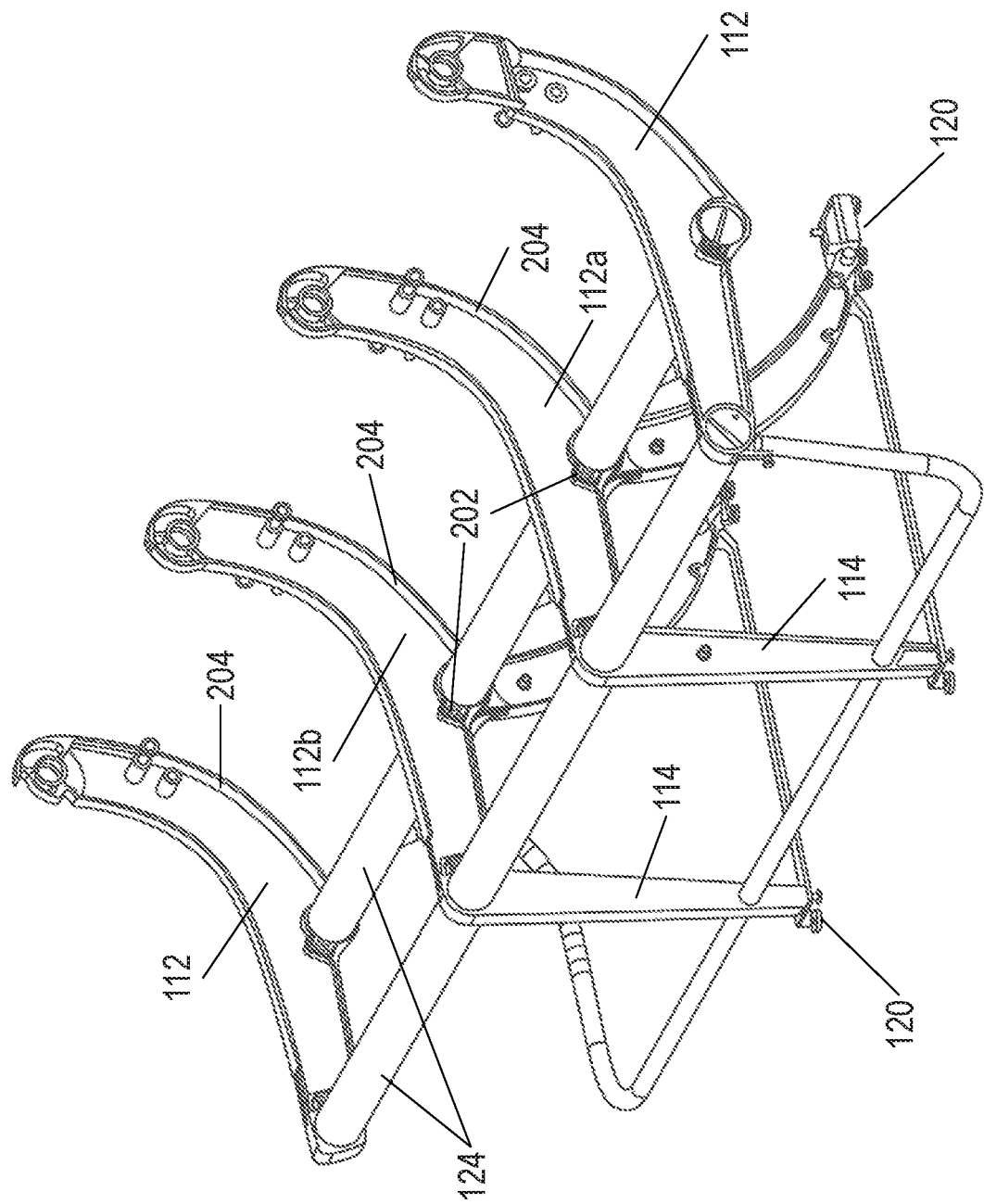

SPRINGLESS DRESS COVER AND LOWER CLOSEOUT SYSTEM FOR PASSENGER SEAT

CROSS-REFERENCE TO RELATED APPLICATIONS

The present application is related to, and incorporates in its entirety, concurrently filed U.S. patent application Ser. No. 17/707,453 entitled WEDGED CLAMPING DEVICE AND METHOD FOR AIRCRAFT SEAT FRAME.

BACKGROUND

Main cabin aircraft passenger seating includes a lower aft portion generally closed out by a lower literature pocket (LLP). LLP construction conventionally involves bent wire springs defining a pocket shape. For example, a passenger occupying the seat directly behind the seat to which the LLP is attached may open the LLP by flexing the pocket aft. However, bent-wire LLPs are also associated with gaps between the LLP and the seat spreaders on either side of the seat. These gaps lead to poor fit and finish generally, and may fail to conceal preferably inaccessible areas of the seat structure from passenger view or passenger access.

SUMMARY

In a first aspect, a springless lower closeout system for a passenger seat is disclosed. In embodiments, the springless lower closeout system includes left-side and right-side seat spreaders defining a lower aft portion of a passenger seat between them. Each seat spreader includes a restrictive channel extending along a portion associated with the lower aft portion of the passenger seat (e.g., seatback). A dress cover extends across the lower aft portion of the passenger seat, concealing the lower aft portion from view and extending in a taut fashion between the left-side and right-side seat spreaders. The dress cover terminates on its left and right sides in a semi-rigid cord element capable of facilitating insertion of the dress cover into the left-side and right-side restrictive channels, and of securing the dress cover in a taut fashion between the left-side and right-side restrictive channels once inserted therein. The dress cover includes a fastener for facilitating insertion of the dress cover into the left-side and right-side restrictive channels, e.g., via temporarily and partially unzipping a left-side or right-side edge of the dress cover from the rest of the dress cover to reduce tension across the dress cover.

In some embodiments, the fastener is concealed behind the dress cover by an additional fastener that may be unfastened to access the first fastener.

In some embodiments, the first fastener is a zipper, and the second fastener is a hook-and-loop fastener concealing the zipper.

In some embodiments, the dress cover includes a literature pocket for the storage of personal items.

In a further aspect, a passenger seating assembly for a vehicle is disclosed. In embodiments, the passenger seating assembly includes one or more passenger seats attached to a seat frame structure. The seat frame structure includes, for each passenger seat, a left-side and right-side seat spreader defining the passenger seat, and particularly a lower aft portion thereof, between them. Each seat spreader includes a restrictive channel extending along a portion associated with the lower aft portion of the passenger seat (e.g., seatback). A dress cover extends across the lower aft portion of each passenger seat, concealing the lower aft portion from view and extending in a taut fashion between the left-side and right-side seat spreaders. Each dress cover terminates on its left and right sides in a semi-rigid cord element capable of facilitating insertion of the dress cover into the left-side and right-side restrictive channels, and of securing the dress cover in a taut fashion between the left-side and right-side restrictive channels once inserted therein. Each dress cover includes a fastener for facilitating insertion of the dress cover into the left-side and right-side restrictive channels, e.g., via temporarily and partially unzipping a left-side or right-side edge of the dress cover from the rest of the dress cover to reduce tension across the dress cover.

In some embodiments, each fastener is concealed behind its respective dress cover by an additional fastener that may be unfastened to access the first fastener.

In some embodiments, each first fastener is a zipper, and each second fastener is a hook-and-loop fastener concealing the zipper.

In some embodiments, each dress cover includes a literature pocket for the storage of personal items.

In some embodiments, the seating assembly is an aircraft seating assembly including one or more passenger seats mountable to an aircraft passenger cabin floor.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2 is an isometric view of a seat frame structure of the passenger seating assembly of FIGS. 1A through 1F including seat spreaders defining a lower aft portion of a passenger seat according to example embodiments of this disclosure;

DETAILED DESCRIPTION

Figure 1A:
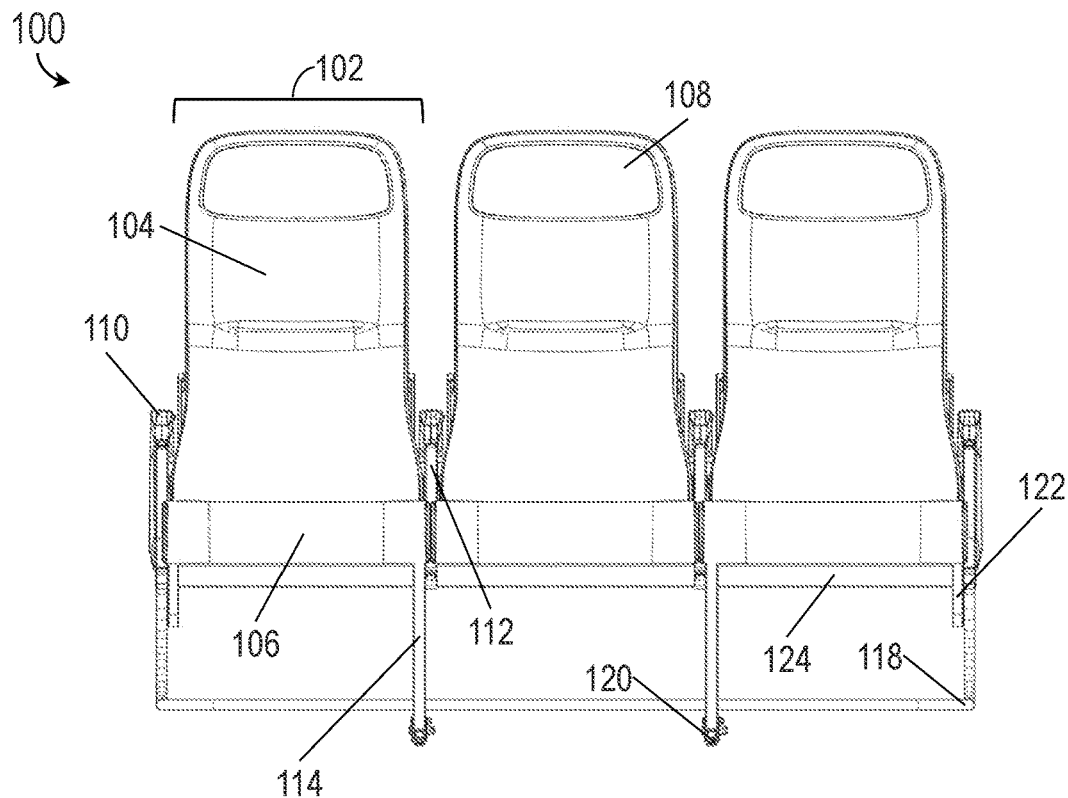
FIGS. 1A through 1F are respectively forward, rear, top, bottom, left-side, and right-side views of a vehicle passenger seating assembly.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to a passenger seating assembly wherein each individual passenger seat includes a lower aft portion closed out, e.g., concealed from view or access by the passenger directly aft, via a springless dress cover directly connected to the seat spreaders on either side of the passenger seat proper. Direct connection of the dress cover, rather than bent wire springs, provides consistent fit and finish and securely conceals preferably inaccessible areas of the seat. Further, passenger comfort is enhanced by removing hard bent wire springs that might otherwise impact the legs of the passenger directly aft of the seat.

Referring generally to FIGS. 1A through 1F, a passenger seating assembly 100 is disclosed. The seating assembly 100 may include passenger seats 102, seatback 104, seat cushion 106, headrest 108, armrest 110, seat spreader 112, legs 114, seatpan 116, baggage rail 118, track fittings 120, steward step 122, and crossbeams 124.

In embodiments, the passenger seating assembly 100 may be implemented in a passenger cabin of an aircraft, e.g., in an economy class cabin. For example, the passenger seating assembly 100 is shown by FIGS. 1A through 1F as comprising a group of three passenger seats 102 (e.g., a window seat, middle seat, and aisle seat), but may alternatively be implemented as a group of two or more seats, e.g., two, four, or five seats depending upon the desired cabin configuration. In embodiments, each passenger seat 102 may support an occupying passenger, e.g., via the seatback 104 and seat cushion 106. Individual passenger seats 102 may be separated from each other by seat spreaders 112 and armrests 110 attached thereto; armrests, for example, may include buttons or switches (not shown) for reclining the seatback 104.

In embodiments, the passenger seating assembly 100 may be fixed to a cabin floor of the passenger cabin via the legs 114 and track fittings 120. For example, whether two, three, four, or five passenger seats 102 are incorporated, the passenger seating assembly 100 may include two legs 114 (each leg comprising, e.g., a forward leg 114a and a rear leg 114b, referring in particular to FIGS. 1E and 1F), each of the forward leg and the rear leg attached by a track fitting 120 to a track (e.g., a set of two parallel tracks (not shown) extending along the passenger cabin in a substantially longitudinal direction). In embodiments, the seat spreaders 112 and legs 114, 114a-114b may be connected by crossbeams 124 extending laterally across the passenger seating assembly 100. For example, the crossbeams 124 may extend through passages in the seat spreaders 112 and/or legs 114, 114a-114b.

In embodiments, the passenger cabin may incorporate multiple rows of passenger seating assemblies 100, each row including a group of passenger seating assemblies in various configurations (e.g., 2-3, 3-3, 3-4-3, 2-5-2, etc.) and each passenger seating assembly including features for use by passengers occupying the passenger seating assembly directly aft. For example, each passenger seating assembly 100 may include a baggage rail 118 to accommodate carry-on luggage and personal items placed under a passenger seat 102 by the passenger occupying the passenger seat directly aft. Similarly, each passenger seat 102 may incorporate an IFE device 126 and/or meal tray 126a set into the seatback 104 and accessible to the passenger occupying the passenger seat directly aft.

Figure 1B:
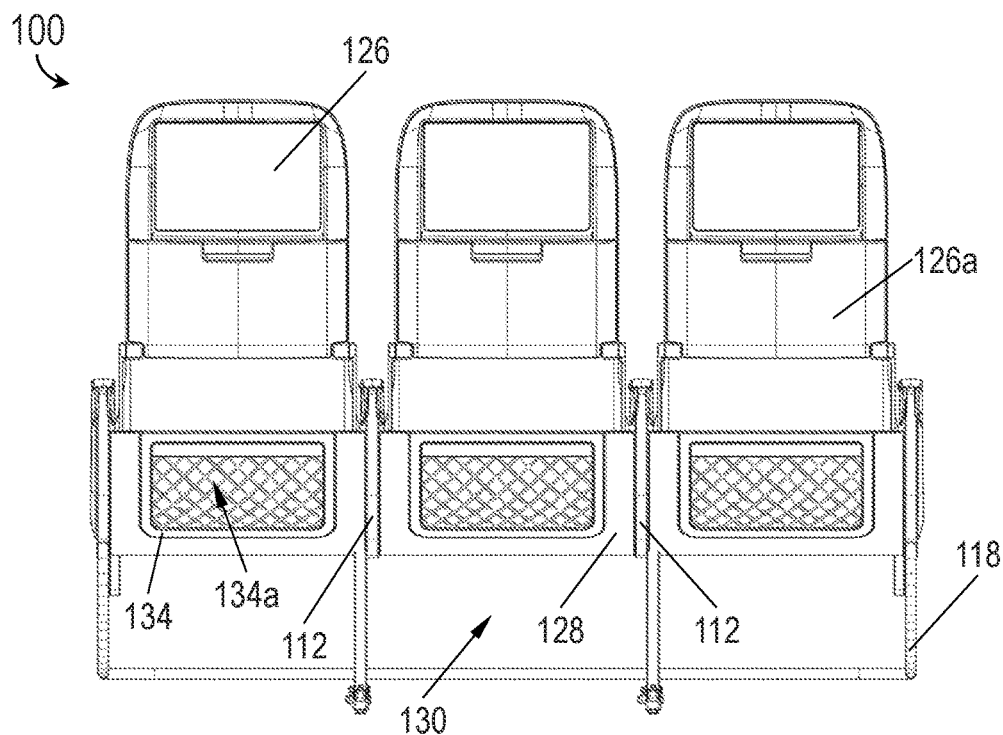
Figure 1C:
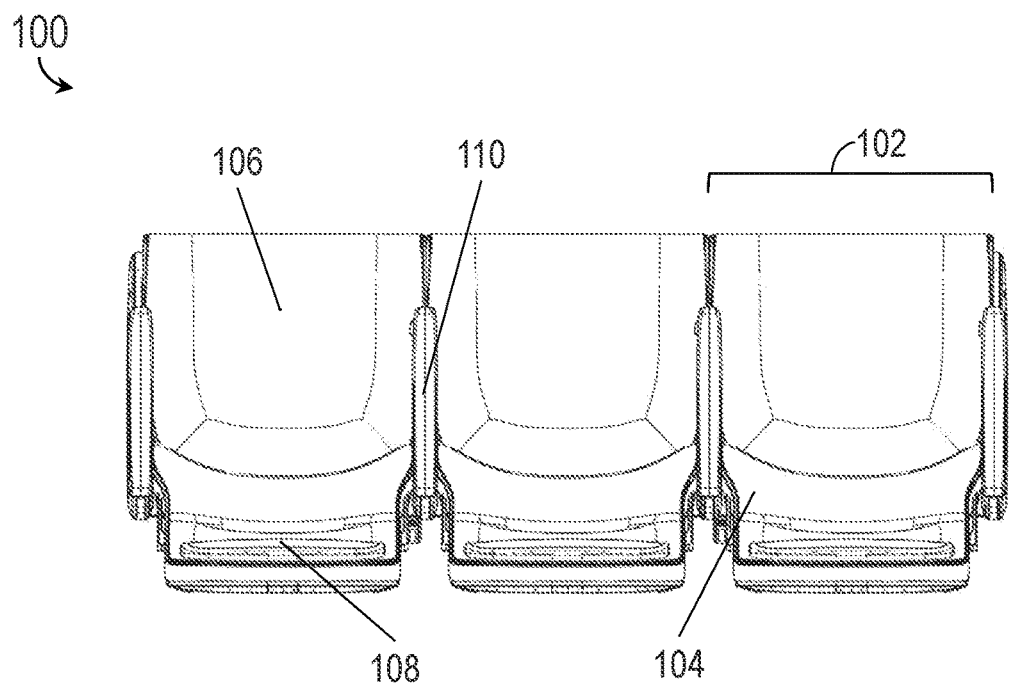
Figure 1D:
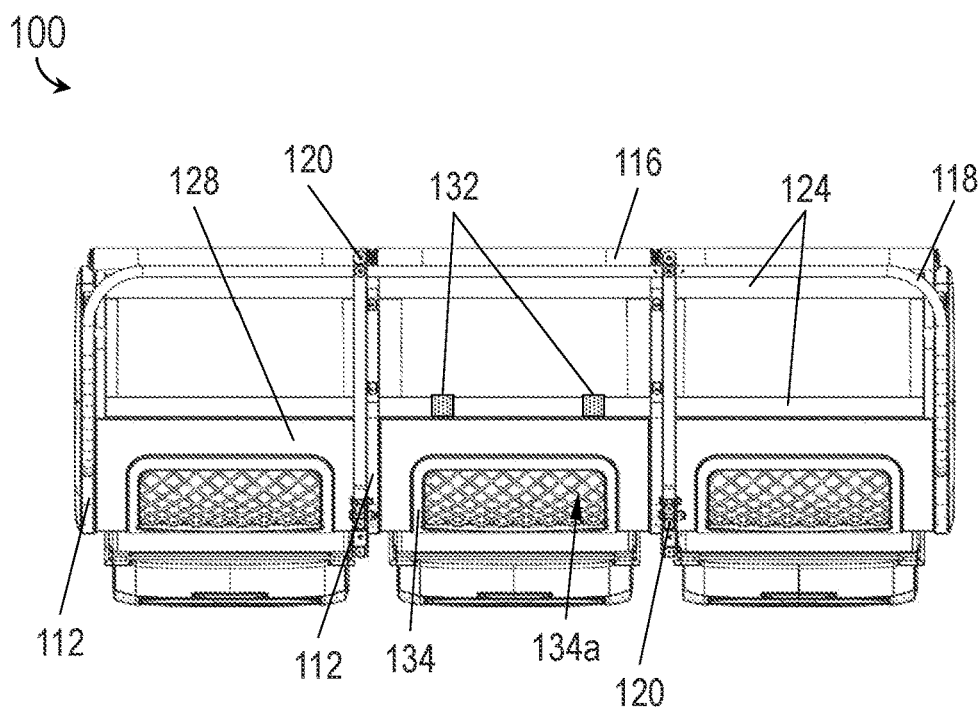

In embodiments, referring in particular to FIGS. 1B and 1D, each passenger seat 102 may include a lower aft portion concealed behind a dress cover 128. For example, each passenger seat 102 may be defined by a left-side and a right-side seat spreader 112 on its left and right sides respectively (e.g., a passenger seating assembly 100 comprising N passenger seats, where N is an integer, may further comprise (N+1) seat spreaders). In embodiments, the lower aft portion of each passenger seat may be disposed directly above a stowage space 130. For example, each stowage space 130 may be used by the passenger seated directly aft of each passenger seat 102 for temporary storage of carry-on or personal items (retained in the stowage space by the baggage rail 118). Alternatively, the stowage space 130 may provide additional leg room for the passenger directly aft of the passenger seat 102.

In embodiments, each dress cover 128 of a passenger seat 102 may be directly connected to the left-side and right-side seat spreaders 112 on either side of the passenger seat. For example, the dress cover 128 may extend between seat spreaders 112 in an optimally taut state, e.g., without sags, wrinkle, or gaps (e.g., between an edge of the dress cover and the seat spreader). In some embodiments, each dress cover 128 may extend at least partially underneath the lower aft portion of the passenger seat 102. For example, the dress cover 128 may conceal the lower aft portion of the passenger seat 102 from view or access by the passenger seated directly aft of the passenger seat while allowing said passenger to safely and comfortably make full use of the stowage space 130, e.g., for item storage or leg room. In some embodiments, the dress cover 128 may be fashioned of one or more layers of natural or synthetic fabrics or leathers, e.g., selected for durability, ease of maintenance, water resistance, flame resistance, etc.

In some embodiments, referring in particular to FIG. 1D, the dress cover 128 may be additionally secured at its bottom end to the rear crossbeam 124, e.g., via straps 132 incorporating hook and loop fasteners or other like fasteners for securing the straps around the rear crossbeam. For example, securing the bottom end of the dress cover 128 may prevent passengers from snagging personal items or carry-on baggage on the bottom end of the dress cover when removing said items or baggage from the stowage space 130.

Figure 1F:
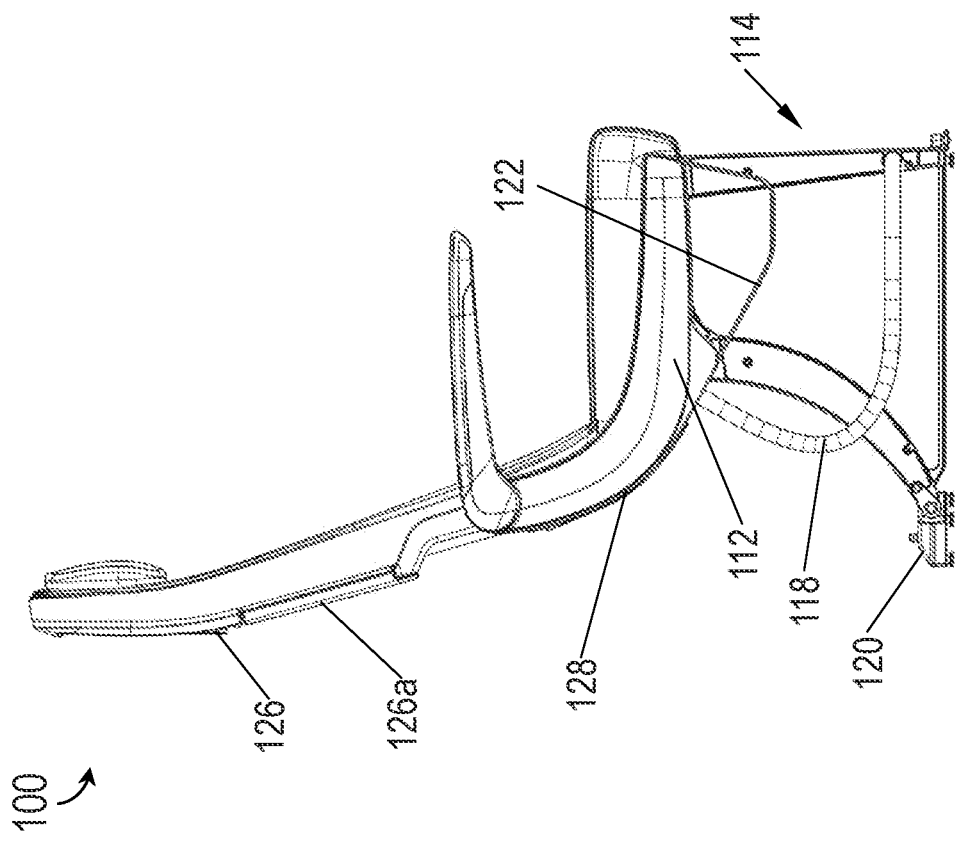
Figure 1E:
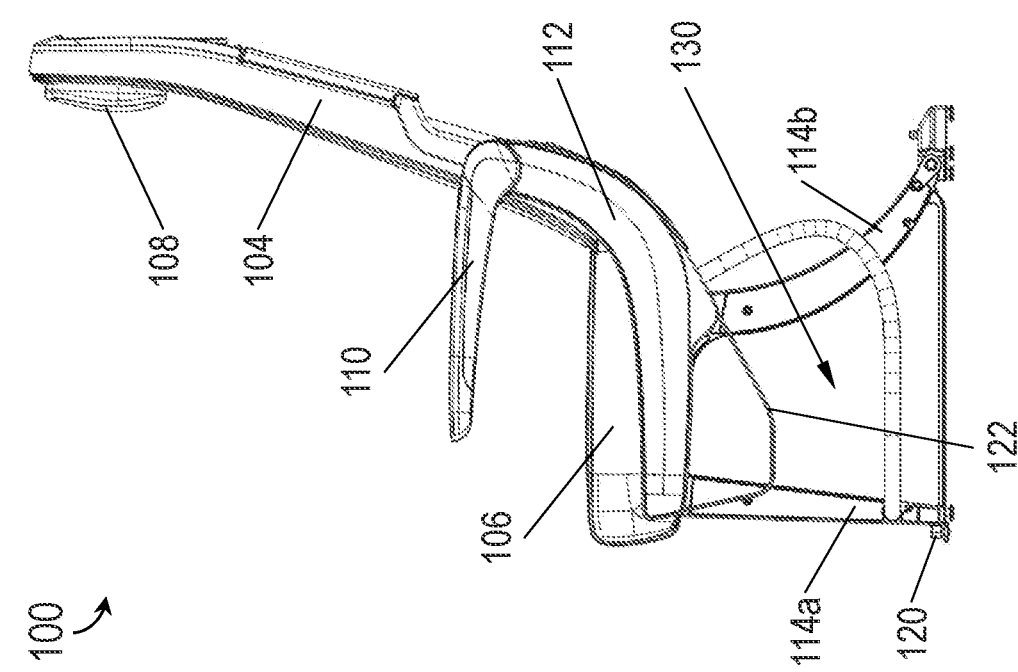

In some embodiments, referring in particular to FIGS. 1E and 1F, the passenger seating assembly 100 may incorporate a steward step 122 for the use of cabin crew and/or passengers who may need additional height to access overhead compartments. For example, the steward step 122 may extend below the seat spreader 112, e.g., on the aisle side of a passenger seat 102 proximate to a central aisle of an aircraft passenger cabin. In some embodiments, the passenger seating assembly 100 may exclude the steward step 122.

In some embodiments, the dress cover 128 may further incorporate a literature pocket 134 set into the dress cover and extending partially or fully across the dress cover. For example, the literature pocket 134 may be configured to hold safety notices, airsick bags, books and magazines, or passenger personal items temporarily stowed therein. In some embodiments, the literature pocket 134 may include an additional layer of dress cover material or, alternatively or additionally, a see-through portion (134a) incorporating, e.g., mesh, translucent, and/or transparent materials.

Referring now to FIG. 2, a seat frame structure 200 of the passenger seat assembly (100, FIGS. 1A-1F) is shown.

In embodiments, the seat frame structure 200 may provide support for each passenger seat (102, FIGS. 1A-1F), e.g., via crossbeams 124, and may secure the passenger seats to a floor of the passenger cabin (e.g., via track fittings 120). For example, each passenger seat 102 may be disposed between two seat spreaders 112, e.g., a left-side seat spreader 112a and a right-side seat spreader 112b on either side. In embodiments, the seat spreaders 112, 112a-112b and/or legs 114, 114a-114b may be secured to the crossbeams via wedged clamping devices 202 (e.g., as disclosed by related U.S. patent application Ser. No. 17/707,453, which application is herein incorporated by reference in its entirety) or like devices configured for securing the seat spreaders and/or legs to the crossbeams.

In some embodiments, the seat frame structure 200 may combine seat spreaders 112a-112b and legs 114 into a single structure. For example, the passenger seating assembly 100 may comprise a group of N passenger seats 102 (e.g., where N is an integer, generally between two and five) separated by (N+1) seat spreaders 112, 112a-112b and mounted to a floor of the passenger cabin by two legs 114 (e.g., fixed to the cabin floor via track fittings 120).

In embodiments, each seat spreader 112, 112a-112b may include a restrictive channel 204 extending along an aft portion of the seat spreader corresponding to a lower aft portion of a passenger seat 102, such that each passenger seat is disposed between a pair of restrictive channels on either side. For example, the seat spreaders 112 on either end (e.g., aisle, window) of the seat frame structure 200 may include a single restrictive channel 204, as each seat spreader is adjacent to only one passenger seat. However, the seat spreaders 112a-112b may each include a restrictive channel 204 in their left side (not shown) and in their right side.

Figure 3A:
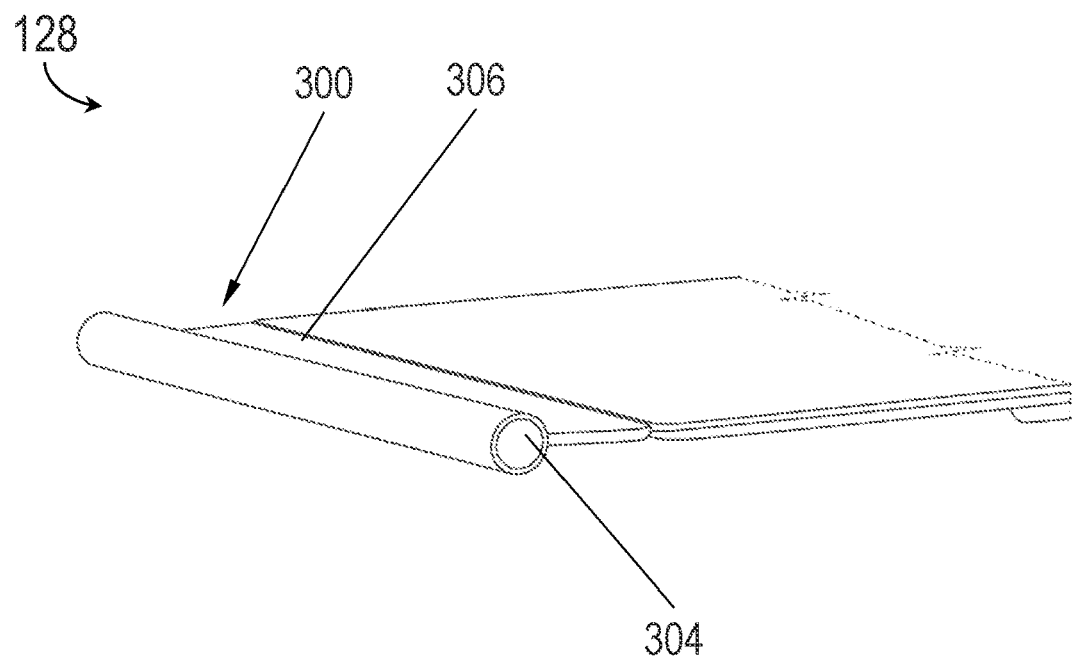
FIGS. 3A and 3B are respectively cross sectional and overhead views of a dress cover of the passenger seating assembly of FIGS. 1A through 1F according to example embodiments of this disclosure.
Figure 3B:
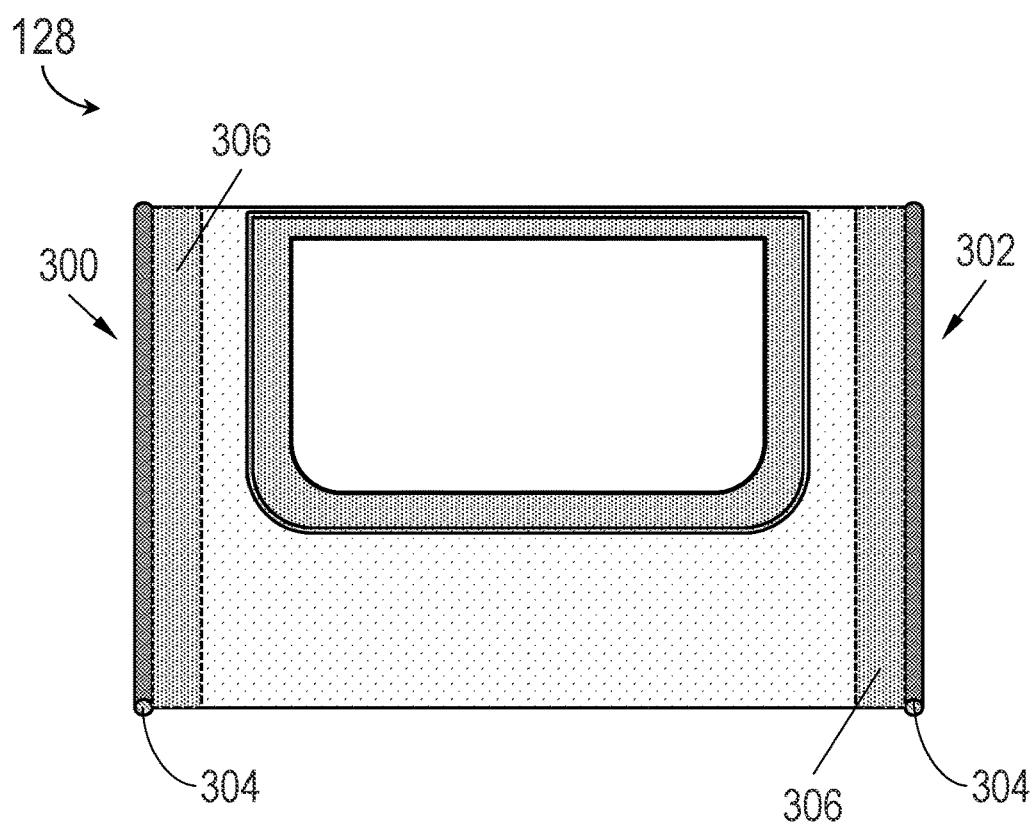

Referring now to FIGS. 3A and 3B, the dress cover 128 is shown.

In embodiments, the dress cover 128 may terminate in a left edge 300 and a right edge 302. For example, the left edge 300 and right edge 302 may each include a cord element 304 or bead feature, e.g., a semi-rigid substantially cylindrical element (e.g., plastic rod, welt cord, prefabricated Keder cord) inserted into or attached to the material of the dress cover 128 along the length of the left edge 300 and the right edge, or around which the material of the dress cover may be wrapped.

In embodiments, one or both of the left edge 300 and the right edge 302 of the dress cover 128 may include an edge portion 306 adjacent or proximate to the cord element 304. For example, the edge portion 306 may include a Keder flap or other reinforcement of the dress cover 128. In embodiments, the edge portion 306 may conceal a fastener for adjusting the tension of the dress cover 128 to facilitate attachment to, or removal from, the seat spreaders (112, 112a-112b; FIG. 2) on either side of the passenger seat (102, FIG. 1) associated with the dress cover, as discussed in greater detail below.

Figure 4A:
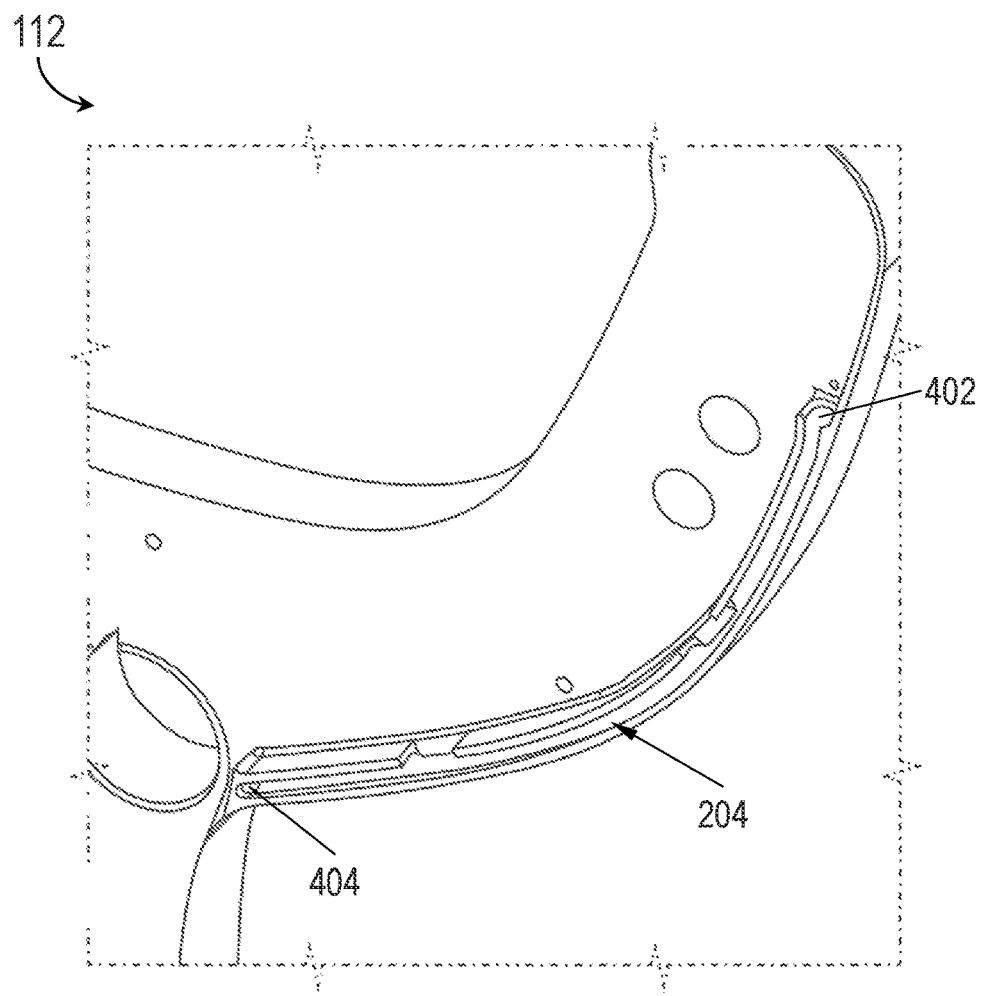
FIGS. 4A and 4B are respectively a detailed isometric view of the seat spreader of FIG. 2 and a detailed top view of a restrictive channel of the seat spreader according to example embodiments of this disclosure.
Figure 4B:
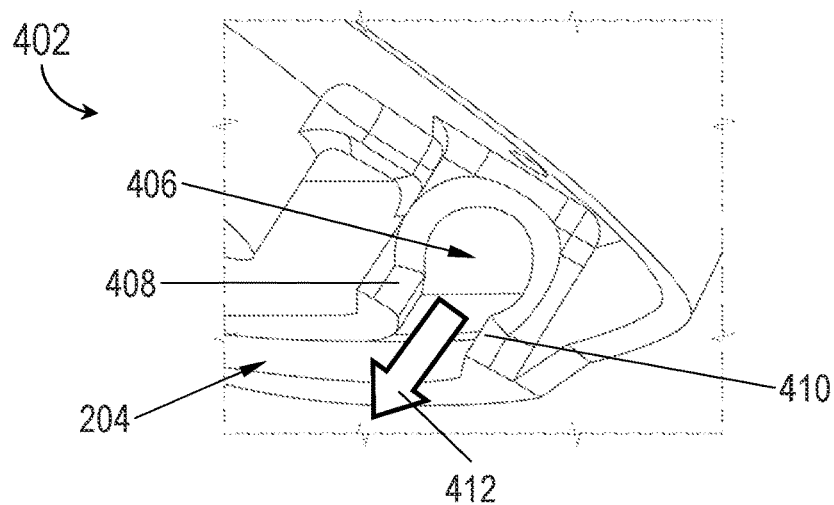

Referring now to FIGS. 4A and 4B, the seat spreader 112 (112a-112b, FIG. 2) is shown.

In embodiments, referring in particular to FIG. 4A, one or both sides of the seat spreader 112 (e.g., the left side shown by FIG. 4A and/or the right side, not shown) may incorporate a restrictive channel 204. For example, the restrictive channel 204 may extend along an aft portion of the seat spreader 112, 112a-112b from an upper end 402 to a lower end 404. In embodiments, the restrictive channel 204 may follow a contour of the seat spreader 112. For example, the restrictive channel 204 may extend along a length corresponding to the length of the cord element (304; FIGS. 3A-3B) from an open upper end 402 (e.g., configured to accept the cord element) to a closed lower end 404 (e.g., configured to retain the cord element).

In embodiments, referring also to FIG. 4B, the upper end 402 of the restrictive channel 204 may include a restrictive channel opening 406 configured to accept a cord element 304 inserted thereinto. For example, the dress cover (128, FIGS. 3A-3B) may be inserted into the restrictive channel 204 via the cord element 304 and threaded through the restrictive channel opening 406 until a bottom end of the cord element reaches the lower end 404 of the restrictive channel.

In embodiments, the restrictive channel 204 may include an upper restrictive surface 408 and a lower restrictive surface 410 extending partially into the restrictive channel opening 406. For example, the upper and lower restrictive surfaces 408, 410 may retain the cord element 304 within the restrictive channel 204 once inserted thereinto, e.g., preventing the cord element from being removed from the restrictive channel in a lateral direction 412. When the cord elements 304 of the left and right edges (300, 302: FIG. 3) are fully inserted into their respective restrictive channels 204, the dress cover 128 may extend across the lower aft portion of the passenger seat (102, FIGS. 1A through 1F) between two adjacent left-side and right-side seat spreaders 112, 112a-112b in an optimally taut state.

In embodiments, the cord element 304 and restrictive channel 204 may be implemented as in U.S. patent application Ser. No. 16/665,534 entitled DIAPHRAGM ATTACHMENT METHOD FOR AIRCRAFT SEATING, which issued Dec. 21, 2041 as U.S. Pat. No. 11,203,434, which application is herein incorporated by reference in its entirety.

Figure 5:
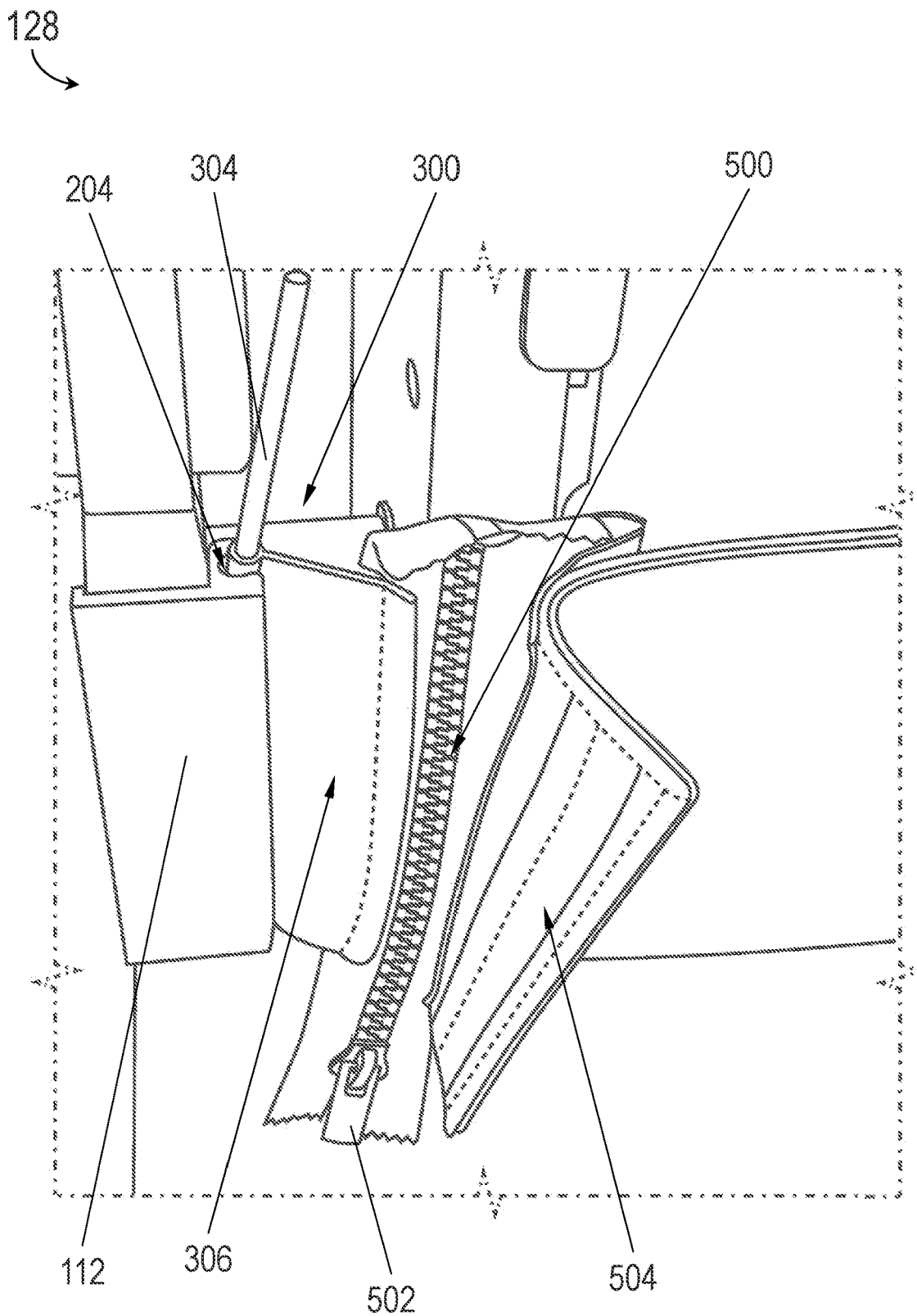
FIG. 5 is a detailed view of a fastener of the dress cover of FIG. 3 according to example embodiments of this disclosure.

Referring in particular to FIG. 5, the dress cover 128 is shown.

In embodiments, the dress cover 128 may include, on either or both of the left edge 300 or right edge (302, FIG. 3B), a fastener 500. For example, the fastener 500 may include a zipper, slider, or other like fastener for securing two portions of the dress cover 128 to each other. In embodiments, the fastener 500 may be used to adjust the tension or taut state of the dress cover 128 to facilitate attachment or removal of the dress cover to or from the left-side and right-side seat spreaders 112 via the restrictive channels 204 set thereinto. For example, the fastener 500 may be a zipper partially unzipped (e.g., via zipper pull 502) to introduce slack into the dress cover 128 (e.g., between the dress cover and an edge portion 306) and facilitate the insertion of the respective cord elements 304 into their corresponding restrictive channels 204. Once the dress cover 128 is fully inserted between the adjacent seat spreaders 112, the fastener 500 may then be re-zipped to restore the tension and/or optimally taut state of the dress cover.

In some embodiments, the fastener 500 may secure the dress cover 128 to an edge portion (306, FIG. 3B) and/or edge 300, 302. In some embodiments, the dress cover 128 or an edge portion 306 thereof may conceal the fastener 500 from view or access by a passenger. For example, the dress cover 128, or an edge portion 306 thereof, may conceal the fastener 500 via a secondary fastener 504, e.g., a hook-and-loop fastener. In embodiments, the secondary fastener 504 may be unfastened, e.g., by crew members or maintenance personnel, to gain access to the fastener 500. In embodiments, the secondary fastener 504 may be re-fastened to conceal the fastener 500 behind, e.g., an outer surface of the dress cover 128 or an edge portion 306 thereof.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A springless lower closeout system for a passenger seat, comprising:

a left-side seat spreader and a right-side seat spreader defining a lower aft portion of a passenger seat, each seat spreader including a restrictive channel extending along an aft portion thereof;

a dress cover configured to extend across the lower aft portion of the passenger seat, the dress cover having a left side and a right side, each side terminating in a cord element configured to retain the left side or the right side within the restrictive channel of the left-side or right-side seat spreader;

and at least one fastener connecting the dress cover to either the left side or right side cord element, the at least one fastener configured to be fastened or unfastened to adjust a tension of the dress cover across the lower aft portion by at least one of securing a first and a second portion of the dress cover to each other or releasing a first and a second portion of the dress cover from each other.

2. The springless lower closeout system of claim 1, wherein the at least one fastener is a first fastener concealed behind the dress cover by at least one second fastener.

3. The springless lower closeout system of claim 2, wherein the at least one first fastener includes a zipper fastener, and the at least one second fastener includes a hook-and-loop fastener.

4. The springless lower closeout system of claim 2, wherein the at least one first fastener includes a slider fastener.

5. The springless lower closeout system of claim 1, wherein the dress cover includes a pocket configured for storage of one or more items.

6. A passenger seating assembly for a vehicle, comprising:

one or more passenger seats attached to a seat frame structure, the seat frame structure including at least one left-side seat spreader and at least one right-side seat spreader defining a lower aft portion of a passenger seat of the one or more passenger seats, each seat spreader including a restrictive channel extending along an aft portion thereof;

each passenger seat including:

a dress cover configured to extend across the lower aft portion, the dress cover having a left side and a right side, each side terminating in a cord element configured to retain the left side or the right side of the dress cover within the restrictive channel of the left-side or right-side seat spreader;

and at least one fastener connecting the dress cover to either the left side or right side cord element, the at least one fastener configured to be fastened or unfastened to adjust a tension of the dress cover across the lower aft portion by at least one of securing a first and a second portion of the dress cover to each other or releasing a first and a second portion of the dress cover from each other.

7. The passenger seating assembly of claim 6, wherein the at least one fastener is a first fastener concealed behind the dress cover by at least one second fastener.

8. The passenger seating assembly of claim 7, wherein the at least one first fastener includes a zipper fastener, and the at least one second fastener includes a hook-and-loop fastener.

9. The passenger seating assembly of claim 7, wherein the at least one first fastener includes a slider fastener.

10. The passenger seating assembly of claim 6, wherein the dress cover includes a pocket configured for storage of one or more items.

11. The passenger seating assembly of claim 6, wherein at least one of the left-side seat spreader or the right-side seat spreader includes:
- a first restrictive channel extending along a first side of the left-side or right-side seat spreader, the first restrictive channel associated with a first dress cover of a first passenger seat,
and
- a second restrictive channel extending along a second side of the left-side or right-side seat spreader, the second side opposite the first side, the second restrictive channel associated with a second dress cover of a second passenger seat.

12. The passenger seating assembly of claim 6, wherein the vehicle is an aircraft and the passenger seating assembly comprises one or more aircraft passenger seats mountable in a passenger cabin of the aircraft.

* * * * *